United States Patent [19]

Dickinson et al.

[11] 4,314,420

[45] Feb. 9, 1982

[54] FISHING DEVICE

[76] Inventors: Robert J. Dickinson, 501 S. Wisconsin; James L. Wagner, 515 E. Fourth, both of Mitchell, S. Dak. 57301

[21] Appl. No.: 131,932

[22] Filed: Mar. 21, 1980

[51] Int. Cl.³ ............................................. A01K 85/00
[52] U.S. Cl. ................... 43/42.39; 43/44.97; 43/42.53
[58] Field of Search ................... 43/42.74, 43.1, 44.96, 43/44.97, 43.15, 42.53, 44.81, 42.39

[56] References Cited

U.S. PATENT DOCUMENTS

| | | | |
|---|---|---|---|
| 2,157,819 | 5/1939 | Eckert | 43/43.15 |
| 2,591,294 | 4/1952 | Ripich | 43/43.15 |
| 3,253,363 | 5/1966 | Steehn | 43/44.97 |
| 3,504,454 | 4/1970 | Turbeville | 43/42.53 X |
| 3,783,549 | 1/1974 | Griggs | 43/44.97 |
| 3,828,463 | 8/1974 | Perrin | 43/42.39 |
| 4,161,838 | 7/1979 | Gapen | 43/42.11 |

Primary Examiner—Stephen G. Kunin
Assistant Examiner—Robert P. Olszewski
Attorney, Agent, or Firm—Kinney, Lange, Braddock, Westman and Fairbairn

[57] ABSTRACT

A fishing device presents lures or bait just off the bottom of a stream, lake, or river. The device includes a sinker having a streamlined body, an L-shaped wire, and a pair of trailing legs. The L-shaped wire has a first attachment loop at the top end of the upper leg for attaching a fishing hook assembly, and a second attachment loop at junction of the upper and lower legs for attaching a fishing line. The lower end of the L-shaped wire is embedded in the sinker. The trailing legs have their front ends embedded in the body of the sinker and extend rearwardly out of the rear end of the sinker to form a V pattern. The tail wires assist in keeping the device upright when trolling, casting, or even when stopped, and propel the device out of rocks and crevices.

6 Claims, 8 Drawing Figures

U.S. Patent  Feb. 9, 1982  4,314,420
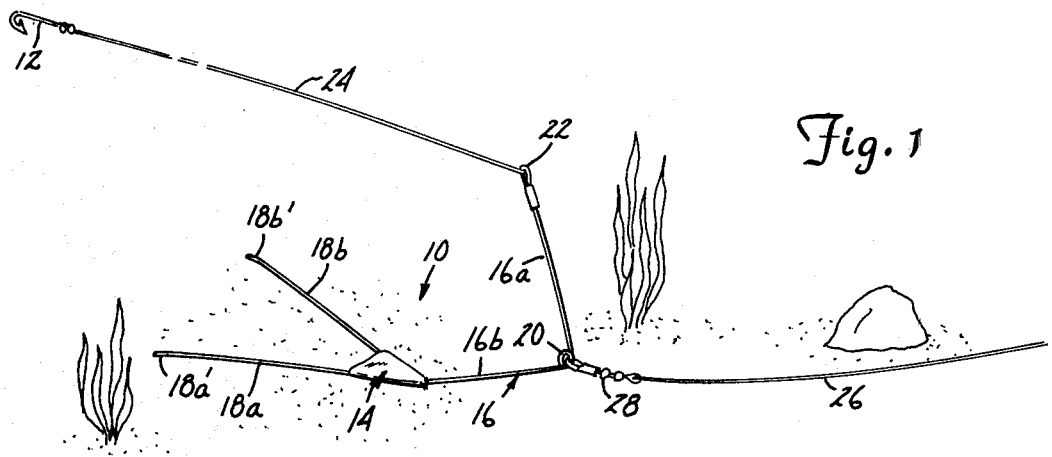
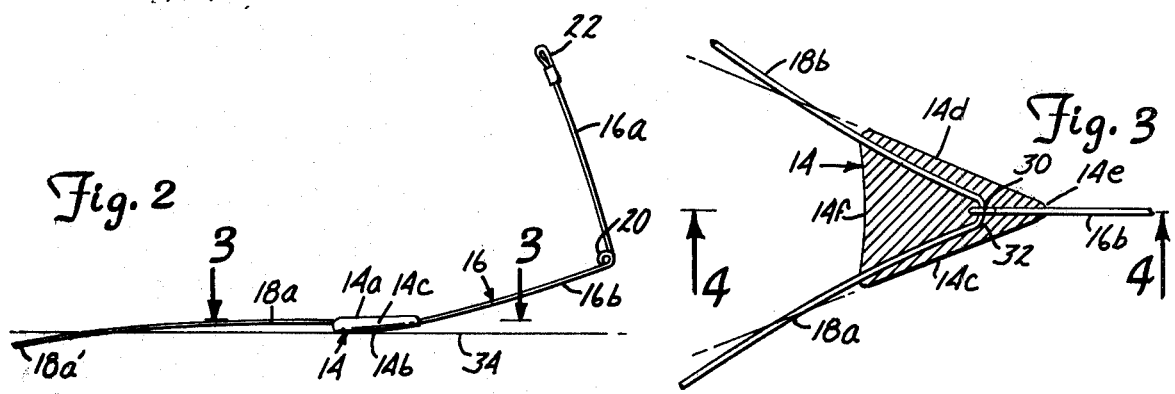
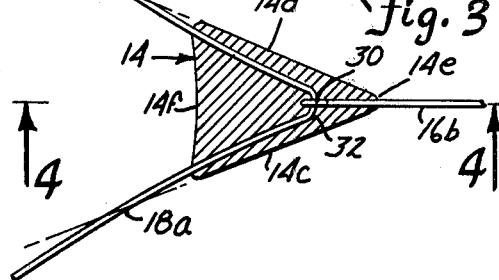
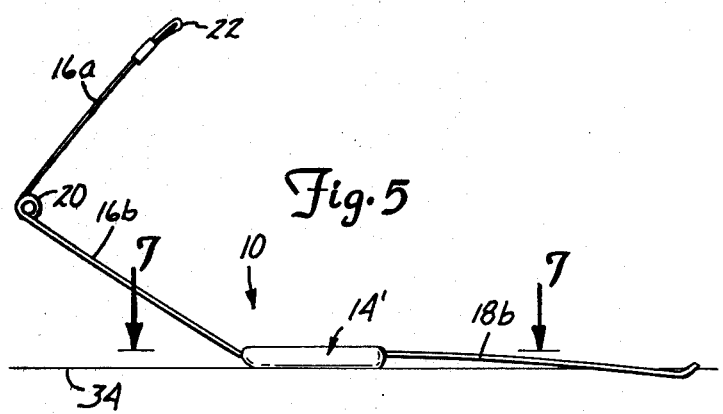
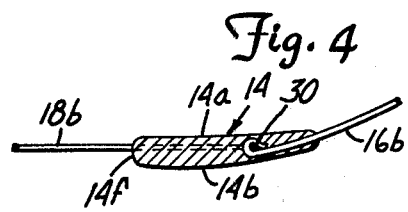
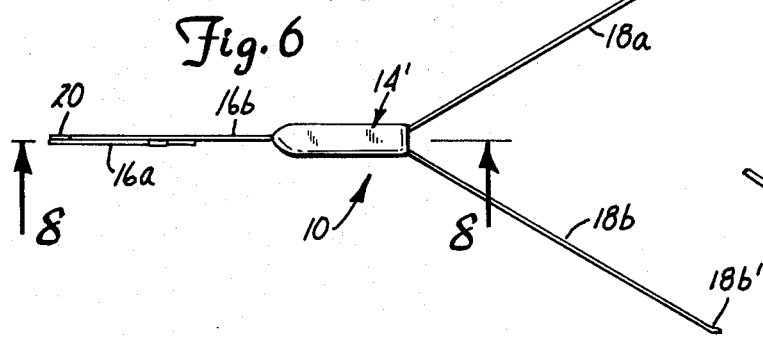
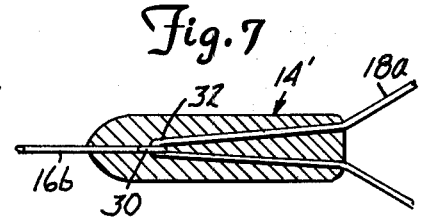
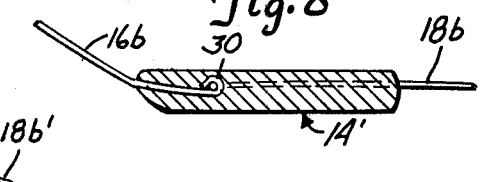

FISHING DEVICE

REFERENCE TO CO-PENDING APPLICATIONS

Reference is made to our co-pending U.S. Design patent application Ser. Nos. 45,987; 45,995; and 45,997, which were filed on June 6, 1979, resulting in U.S. Pat. Nos. D 258,305, D 259,505, and D 259,436 respectively.

BACKGROUND OF THE INVENTION

1. Field of the Invention

The present invention relates to fishing devices. In particular, the present invention is a fish hook support and sinker device which allows a fisherman to present lures or bait just off the bottom of a stream, lake or river.

2. Description of the Prior Art

One of the most popular outdoor recreational activities is fishing. The great popularity of fishing has led to a constant demand for all sorts of fishing equipment which fishermen hope will help them catch more and bigger fish.

U.S. Pat. No. 2,591,294 by S. J. Ripich shows a fishing device which is designed to support the hook and bait above the bottom of a stream, lake or river so as to make the bait more attractive to fish and to prevent live bait from hiding under rocks or other debris at the bottom of the body of water.

The device shown in the Ripich patent has a pear-shaped sinker with an L-shaped wire attached and extending out of the front, narrow end of the sinker. The L-shaped wire has an attachment loop at the upper end of its upper leg for attaching the fish hook assembly. In addition, the L-shaped wire has a twist at the junction of the upper and lower legs which forms an attachment loop for the fish line.

U.S. Pat. No. 4,161,838 by D. D. Gapen, shows a device which is essentially identical to the Ripich device, except that the sinker body of the Gapen device is narrower than the sinker body of the Ripich device. As a result, the Gapen device has a tendency to tip over on its side when stopped.

SUMMARY OF THE INVENTION

The present invention is an improved device for presenting lures and baits just off the bottom of the body of water which has the ability to stay upright at all times and has the improved ability to resist snagging in rocks, crevices and the like. The fishing device of the present invention includes a sinker having a streamlined body with a front and a rear end, first and second sides, a top and a bottom. An L-shaped wire with upper and lower legs provides a first attachment loop for attaching a fishing hook assembly and a second attachment loop for attaching a fishing line. The first attachment loop is located at the upper end of the upper leg of the L-shaped wire, while the attachment loop is located at the junction of the upper and lower legs. The lower end of the lower leg is embedded in the sinker, and the lower leg extends forward and upward out of the front end of the sinker. The fishing device further includes first and second trailing legs which have their forward ends embedded in the sinker body and which extend out of the rear end of the sinker body. The first and second trailing legs diverge so as to form a V pattern behind the sinker body.

In preferred embodiments of the invention, the trailing legs have a length which is equal to or greater than the distance from the front end of the sinker to the second attachment loop. The legs form an angle which is greater than the angle defined by the sides of the sinker. The outer rear ends of the trailing legs extend below a plane defined by the bottom of the sinker. As a result, the legs maintain the device in an upright position, even when the device is stopped, and resists snagging of the device by propelling the device out of rocks and crevices. In another important embodiment of the present invention, the trailing legs are formed of a single, generally V-shaped wire having an apex within the sinker. The lower end of the lower leg of the L-shaped wire preferably has a hook which at least partially surrounds the apex of the V-shaped wire. As a result, neither the L-shaped wire nor the trailing legs can be pulled out of the sinker body.

BRIEF DESCRIPTION OF THE DRAWINGS

FIG. 1 is a perspective view of a first embodiment of the fishing device of the present invention in operation supporting a fishing hook.

FIG. 2 is a side view of the fishing device of FIG. 1.

FIG. 3 is a sectional view along line 3—3 of FIG. 2.

FIG. 4 is a sectional view along section 4—4 of FIG. 3.

FIG. 5 is a side view of a second embodiment of the fishing device of the present invention.

FIG. 6 is a top view of the fishing device of FIG. 5.

FIG. 7 is a sectional view along section 7—7 of FIG. 5.

FIG. 8 is a sectional view along line 8—8 of FIG. 6.

DETAILED DESCRIPTION OF THE PREFERRED EMBODIMENTS

FIGS. 1-4 show a first embodiment of the fishing device of the present invention. In FIG. 1, fishing device 10 is shown in operation in supporting fish hook 12 off the bottom of a lake, river or other body of water. The device of the present invention includes sinker 14, L-shaped wire 16, and a pair of trailing wire legs 18a and 18b.

Sinker 14 is a streamlined body of lead or other suitable sinker material having a top surface 14a, a bottom surface 14b, sides 14c and 14d, a narrow front end 14e, and a rear end 14f. In the embodiments shown in FIGS. 1-4, sinker 14 has a generally arrowhead shaped body, with a narrow front end 14e and a broader rear end 14f. Sides 14c and 14d are generally straight and diverge as they extend rearward from front end 14e to rear end 14f of sinker 14.

L-shaped wire 16 has an upper leg 16a and a lower leg 16b, which are joined together at a helical coil or loop 20. Upper leg 16a has an attachment loop 22 formed at its upper end, to which line 24 and hoop 12 are connected. Helical loop 20 forms an attachment loop for fishing line 26, which is connected to loop 20 by swivel assembly 28.

Lower leg 16b of L-shaped wire 16 has its lower end embedded in sinker 14. As best shown in FIGS. 3 and 4, hook 30 is formed at the lower end of lower leg 16b. In the preferred embodiments shown in FIGS. 3 and 4, wire legs 18a and 18b are formed of a single wire which is in a generally V shape and has its apex embedded within sinker 14. Hook 30 of wire leg 16b at least partially is hooked around wires 18a–18b at their apex 32. As a result, neither leg 16b nor legs 18a and 18b can be pulled from sinker 14.

Legs 18a and 18b extend out of sinker 14 through back surface 14f. As best shown in FIG. 3, legs 18a and 18b preferably diverge at an angle which is greater than an angle defined by sides 14c and 14d of sinker 14. In addition, legs 18a and 18b preferably extend downwardly slightly so that tips 18a' and 18b' extend slightly below a plane 34 defined by bottom surface 14b of sinker 14. Legs 18a and 18b have a length which is at least equal, and preferably greater than, the distance from front end 14e to helical loop 20.

Legs 18a and 18b provide two important functions. First, the legs provide stability to the device, thereby preventing it from tipping over. With the present invention, device 10 remains upright when trolling, casting, or even when stopped.

Second, legs 18a and 18b resist snagging of device 10, and in fact, propel the device out of rocks and crevices. As device 10 passes through a crevice, or between rocks, legs 18a and 18b contract. In preferred embodiments of the present invention, legs 18a and 18b are made out of spring stainless steel, which causes the legs 18a and 18b to spring and propel the device out of crevices when they have become sufficiently contracted from their diverged normal position.

Another important advantage of the present invention is the use of a helical coil or loop 20 rather than a twist, as used in the prior art Ripich and Gapen patents. Helical coil 20 provides legs 16a and 16b of L-shaped wire 16 with a flexing action which is appreciated by the fisherman and can be felt when a fish is striking the lure. In addition, L-shaped wire 16 is far less likely to break because of the use of helical coil 20 rather than a twist.

FIGS. 5–8 show side, top and sectional views of another embodiment of the fishing device of the present invention. The device shown in FIGS. 5–8 is generally similar to the device shown in FIGS. 1–4, except for the shape of sinker body 14', which is a narrow body, rather than the arrowhead shaped body of sinker 14 in FIGS. 1–4. Similar element numbers in FIGS. 5–8 have been used to designate elements which are similar to those used in the device of FIGS. 1–4.

In the device of FIGS. 5–8, trailing legs 18a and 18b provide the sole support of the device in the upright position. This differs from the embodiment shown in FIGS. 1–4, in which the distribution of weight of sinker body 14 is such that it also assists in maintaining device 10 upright. The device of FIGS. 5–8, however, has the advantage of having a sinker 14' which is somewhat lighter and more streamlined than the device of FIGS. 1–4.

As best illustrated in FIG. 6, trailing legs 18a and 18b optionally have been bent slightly inward near their trailing ends 18a' and 18b'.

The fishing devices of the present invention are capable of efficient large scale manufacturing. In a preferred embodiment of the present invention, legs 18a and 18b are formed of a single stainless steel spring wire and are bent to the desired V shape. L-shaped wire 16 is also bent to shape, with a helical coil loop 20 being formed at the junction between legs 16b and 16a, and an attachment loop 22 is formed at the upper end of leg 16a. Loop 30 is formed at the bottom end of lower leg 20b, and is hooked around the apex 32 of the V-shaped wire forming legs 18a and 18b. The two interconnected wires are then placed in a mold, and molten lead is poured into the mold to form the sinker body 14 or 14'.

In an alternative embodiment, helical coil 20 and attachment loop 22 are formed after sinker body 14 and 14' has been cast. In either case, the use of hook 30, which engages apex 32, not only ensures that the wires will not pull out of sinker body 14 or 14' during use, but also assists in properly positioning the wires during the forming of sinker body 14 or 14'.

In conclusion, the present invention is an improved fishing device which allows a fisherman to present lures or bait just off the bottom of a stream, lake or river in a way as to be most attractive to the fish, and to be the most practical and logical to the fisherman. The device of the present invention remains upright while in use, even when movement of the device is stopped. The device is capable of manufacture in various sizes and can be adapted to many types and styles of fishing, from streams and lakes to salt water. The device glides through the water unrestricted in an upright condition due to the combined action of the sinker body and the trailing legs. In addition, the trailing legs propel the device out of rocks and crevices when ordinary trolling devices would be lost.

Although the present invention has been described with reference to preferred embodiments, workers skilled in the art will recognize that changes may be made in form and detail without departing from the spirit and scope of the invention.

What is claimed is:

1. A self-righting sinker and lure support comprising:
    a sinker having a streamlined body with front and rear ends, first and second sides, and a top and a bottom;
    an L-shaped wire having an upper leg and a lower leg, the upper leg having a first attachment loop at its upper outer end for attachment of a fishing hook assembly and forming at its lower end with the upper end of the lower leg a second attachment loop for attaching a fishing line, the lower leg having its lower outer end embedded in the sinker and extending out of the front end of the sinker, wherein the second attachment loop is positioned above and forward of the front end of the sinker, and wherein the first attachment loop is positioned above and rearward of the second attachment loop; and
    a V-shaped wire bent substantially at its mid-point to form first and second trailing legs having their forward ends embedded in the sinker and extending out of the rear end of the sinker, the first and second trailing legs diverging from one another, the lower outer end of the lower leg of said L-shaped wire having a hook which extends over said V-shaped wire substantially at its mid-point to aid in retaining said V-shaped wire in said sinker despite any pulling force that may be exerted on the trailing legs of the V-shaped wire.

2. The invention of claim 1 wherein the trailing legs diverge at an angle of divergence which is greater than an angle defined by the first and second sides of the sinker.

3. The invention of claim 1 wherein the trailing legs have outer ends which extend below a plane defined by the bottom of the sinker.

4. The invention of claim 1 wherein the second attachment loop is a helical loop formed by the upper and lower legs of the L-shaped wire.

5. The invention of claim 1 wherein the trailing legs have a length from the rear end of the sinker to their outer ends which is equal to or greater than a distance from the front end of the sinker to the second attachment loop.

6. A method of making a self-righting sinker and lure support, the method comprising:

forming a first V-shaped wire bent substantially at its mid-point to form first and second trailing legs diverging from one another;

providing a second L-shaped wire having an upper leg and a lower leg, the upper leg having a first attachment loop at its upper outer end for attachment of a fishing hook assembly and forming at its lower end with the upper end of the lower leg a second attachment loop for attaching a fishing line, the lower outer end of the lower leg of said L-shaped wire having a hook;

forming a sinker body around said first and second wires with the hook of the second L-shaped wire embedded in the sinker body and extending over said first V-shaped wire substantially at its mid-point to aid in retaining said V-shaped wire in said sinker body despite any pulling force that may be exerted on the trailing legs of the V-shaped wire, and with the ends of the first V-shaped wire extending out of a rear end of the sinker body to form the first and second trailing legs and the lower end of the L-shaped second wire extending out a front end of the sinker body, said second attachment loop being positioned above and forward of the front end of the sinker body and the first attachment loop being positioned above and rearward of the second attachment loop.

* * * * *